(12) United States Patent
Hata et al.

(10) Patent No.: US 9,895,934 B2
(45) Date of Patent: Feb. 20, 2018

(54) PNEUMATIC TIRE

(71) Applicant: The Yokohama Rubber Co., LTD., Minato-ku, Tokyo (JP)

(72) Inventors: Hiroshi Hata, Hiratsuka (JP); Yuji Sato, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 261 days.

(21) Appl. No.: 14/432,742

(22) PCT Filed: Sep. 30, 2013

(86) PCT No.: PCT/JP2013/076597
§ 371 (c)(1),
(2) Date: Mar. 31, 2015

(87) PCT Pub. No.: WO2014/054597
PCT Pub. Date: Apr. 10, 2014

(65) Prior Publication Data
US 2015/0251494 A1    Sep. 10, 2015

(30) Foreign Application Priority Data

Oct. 3, 2012  (JP) .................. 2012-221008

(51) Int. Cl.
*B60C 9/02*    (2006.01)
*B60C 5/14*    (2006.01)
(Continued)

(52) U.S. Cl.
CPC ............... *B60C 9/14* (2013.01); *B29D 30/30* (2013.01); *B29D 30/3042* (2013.01);
(Continued)

(58) Field of Classification Search
CPC .. B60C 5/14; B60C 5/142; B60C 9/00; B60C 9/0207
See application file for complete search history.

(56) References Cited

U.S. PATENT DOCUMENTS 1,918,553 A     7/1933  Musselman
3,625,271 A  * 12/1971  Hutch .................... B60C 15/00
                                                           152/540
(Continued)

FOREIGN PATENT DOCUMENTS

JP    56077134    *  6/1981
JP    S62-241704    10/1987
(Continued)

OTHER PUBLICATIONS

International Search Report for International Application No. PCT/JP2013/076597 dated Dec. 24, 2013, 4 pages, Japan.

*Primary Examiner* — Justin R Fischer
(74) *Attorney, Agent, or Firm* — Thorpe North & Western

(57) ABSTRACT

In a pneumatic tire that includes strip members which extends in a tire circumferential direction, both ends thereof reaching each bead portion, a belt layer is disposed in a tread portion on an outer side in a tire radial direction of the strip members. The strip members are divided in the tire width direction, and the divided strip members have joints that join together in the tire circumferential direction. Relative positions of the joints are disposed deviated by not less than 20° in the tire circumferential direction within a region between an edge of a maximum width in the tire width direction of the belt layer and a maximum tire width position.

10 Claims, 12 Drawing Sheets

(51) Int. Cl.
    *B60C 9/14* (2006.01)
    *B29D 30/30* (2006.01)
    *B29D 30/70* (2006.01)
    *B60C 5/12* (2006.01)
    *B60C 15/00* (2006.01)
    *B29D 30/42* (2006.01)

(52) U.S. Cl.
    CPC ............... *B29D 30/70* (2013.01); *B60C 5/12* (2013.01); *B60C 9/023* (2013.01); *B60C 9/0207* (2013.01); *B60C 15/0009* (2013.01); *B29D 2030/423* (2013.01); *B29D 2030/705* (2013.01); *B60C 2005/147* (2013.01); *Y10T 152/10855* (2015.01)

(56) References Cited

U.S. PATENT DOCUMENTS

| 4,815,514 A | 3/1989 | Hara et al. |
| 2007/0044885 A1 | 3/2007 | Nishitani |
| 2010/0154954 A1 | 6/2010 | Saotome |

FOREIGN PATENT DOCUMENTS

| JP | 04090902 | * | 3/1992 |
| JP | H05-221204 | | 8/1993 |
| JP | H05-246207 | | 9/1993 |
| JP | H11-0286059 | | 10/1999 |
| JP | H11-286059 | | 10/1999 |
| JP | 2001-039110 | | 2/2001 |
| JP | 2002-205510 | | 7/2002 |
| JP | 2007-055020 | | 3/2007 |
| JP | 2007-196746 | * | 8/2007 |
| JP | 2010-143386 | | 7/2010 |
| JP | 2011-245766 | | 12/2011 |
| JP | 2012-076662 | | 4/2012 |
| JP | 2013-146933 | | 8/2013 |

* cited by examiner

| | | Conventional Example | Comparative Example 1 | Working Example 1 | Working Example 2 | Working Example 3 | Working Example 4 | Working Example 5 | Working Example 6 | Working Example 7 | Working Example 8 |
|---|---|---|---|---|---|---|---|---|---|---|---|
| Carcass layer | Divided or not | × | ○ | ○ | ○ | ○ | ○ | ○ | ○ | ○ | ○ |
| | Joint position not less than 20° | - | × | ○ | ○ | ○ | ○ | ○ | ○ | ○ | ○ |
| | Plurality of joints disposed in tire circumferential direction | - | One joint | One joint | Uniform | Non-uniform | Non-uniform | Non-uniform | Non-uniform | Non-uniform | Non-uniform |
| Inner liner layer | Divided or not | × | × | × | × | × | × | × | × | × | × |
| | Joint position not less than 20° | - | - | - | - | - | - | - | - | - | - |
| | Plurality of joints disposed in tire circumferential direction | - | - | - | - | - | - | - | - | - | - |
| Joint positions of carcass layer and inner liner layer not less than 20° | | - | - | - | - | - | - | - | - | - | - |
| Divided width of carcass layer (percentage to maximum width of belt layer) (%) | | 0 | 0 | 0 | 0 | 0 | -35 | -30 | 50 | 95 | 97 |
| Uniformity (RFV) | | 100 | 100 | 102 | 102 | 105 | 105 | 105 | 105 | 105 | 105 |
| Tire Weight | | 100 | 100 | 100 | 100 | 100 | 95 | 100 | 105 | 110 | 112 |
| Durability | | ○ | ○ | ○ | ○ | ○ | ○ | ○ | ○ | ○ | × |

FIG. 10

|  |  | Conventional Example | Comparative Example 2 | Working Example 9 | Working Example 10 | Working Example 11 |
|---|---|---|---|---|---|---|
| Carcass layer | Divided or not | × | × | × | × | × |
|  | Joint position not less than 20° | - | - | - | - | - |
|  | Plurality of joints disposed in tire circumferential direction | - | - | - | - | - |
| Inner liner layer | Divided or not | × | ○ | ○ | ○ | ○ |
|  | Joint position not less than 20° | × | × | ○ | ○ | ○ |
|  | Plurality of joints disposed in tire circumferential direction | - | One joint | One joint | Uniform | Non-uniform |
| Joint positions of carcass layer and inner liner layer not less than 20° | | - | - | - | - | - |
| Divided width of carcass layer (percentage to maximum width of belt layer) (%) | | - | - | - | - | - |
| Uniformity (RFV) | | 100 | 100 | 102 | 102 | 105 |
| Tire Weight | | 100 | 100 | 100 | 100 | 100 |
| Durability | | ○ | ○ | ○ | ○ | ○ |

FIG. 11

|  |  | Conventional Example | Comparative Example 3 | Working Example 12 | Working Example 13 | Working Example 14 | Working Example 15 | Working Example 16 | Working Example 17 |
|---|---|---|---|---|---|---|---|---|---|
| Carcass layer | Divided or not | × | ○ | ○ | ○ | ○ | ○ | ○ | ○ |
|  | Joint position not less than 20° | - | × | ○ | ○ | ○ | ○ | ○ | ○ |
|  | Plurality of joints disposed in tire circumferential direction | - | One joint | One joint | Uniform | Non-uniform | Uniform | Non-uniform | Uniform |
| Inner liner layer | Divided or not | × | ○ | ○ | ○ | ○ | ○ | ○ | ○ |
|  | Joint position not less than 20° | - | × | ○ | ○ | ○ | ○ | ○ | ○ |
|  | Plurality of joints disposed in the tire circumferential direction | - | One joint | One joint | Uniform | Uniform | Non-uniform | Non-uniform | Uniform |
| Joint positions of carcass layer and inner liner layer not less than 20° |  | - | × | × | × | × | × | × | ○ |
| Divided width of carcass layer (percentage to maximum width of belt layer) (%) |  | - | ○ | ○ | ○ | ○ | ○ | ○ | ○ |
| Uniformity (RFV) |  | 100 | 100 | 102 | 102 | 105 | 105 | 108 | 104 |
| Tire Weight |  | 100 | 100 | 100 | 100 | 100 | 100 | 100 | 100 |
| Durability |  | ○ | ○ | ○ | ○ | ○ | ○ | ○ | ○ |

FIG. 12A

| | | Working Example 18 | Working Example 19 | Working Example 20 | Working Example 21 | Working Example 22 | Working Example 23 | Working Example 24 | Working Example 25 |
|---|---|---|---|---|---|---|---|---|---|
| Carcass layer | Divided or not | ○ | ○ | ○ | ○ | ○ | ○ | ○ | ○ |
| | Joint position not less than 20° | ○ | ○ | ○ | ○ | ○ | ○ | ○ | ○ |
| | Plurality of joints disposed in tire circumferential direction | Non-uniform | Uniform | Non-uniform | Non-uniform | Non-uniform | Non-uniform | Non-uniform | Non-uniform |
| Inner liner layer | Divided or not | ○ | ○ | ○ | ○ | ○ | ○ | ○ | ○ |
| | Joint position not less than 20° | ○ | ○ | ○ | ○ | ○ | ○ | ○ | ○ |
| | Plurality of joints disposed in the tire circumferential direction | Uniform | Non-uniform | Non-uniform | Non-uniform | Non-uniform | Non-uniform | Non-uniform | Non-uniform |
| Joint positions of carcass layer and inner liner layer not less than 20° | | ○ | ○ | ○ | ○ | ○ | ○ | ○ | ○ |
| Divided width of carcass layer (percentage to maximum width of belt layer) (%) | | 0 | 0 | 0 | -35 | -30 | 50 | 95 | 97 |
| Uniformity (RFV) | | 107 | 107 | 110 | 110 | 110 | 110 | 110 | 110 |
| Tire Weight | | 100 | 100 | 100 | 95 | 100 | 105 | 110 | 112 |
| Durability | | ○ | ○ | ○ | ○ | ○ | ○ | ○ | × |

FIG. 12B

PNEUMATIC TIRE

TECHNICAL FIELD

The present technology relates to a pneumatic tire, and more particularly relates to a pneumatic tire with improved strip members, such as carcass layers, inner liner layers, and the like, which extend in the tire circumferential direction, both ends thereof in the tire width direction reaching each of the bead portions.

BACKGROUND

Conventionally, for example in Japanese Unexamined Patent Application No. H5-221204, a pneumatic tire (radial pneumatic tire) is disclosed in which both ends of a carcass layer extending in the tire circumferential direction are butt spliced, both ends of an inner liner layer arranged on a tire inner side of this carcass layer, made of impermeable rubber, and extending in the tire circumferential direction are lap spliced, and in which there is a region where the carcass layer butt splice and the inner liner layer lap splice are overlapped.

The strip members such as the carcass layer and the inner liner layer and the like, which extend in the circumferential direction, both ends thereof reaching each of the bead portions, are configured so that both ends in the tire circumferential direction are joined (spliced), as in the pneumatic tire disclosed in Japanese Unexamined Patent Application No. H5-221204 as described above. This joint is provided continuously in the radial direction. In the case of this configuration, there is a possibility that uniformity deteriorates due to non-uniformity of the force acting on the ground surface (Radial Force Variation: RFV), particularly in the regions between the edges of the maximum width in the tire width direction of the belt layer and the maximum tire width positions. In recent years, it has been desired to resolve this type of problem in order to further improve tire performance.

SUMMARY

With the foregoing in view, the present technology provides a pneumatic tire that is capable of improving uniformity.

The pneumatic tire according to a first embodiment is a pneumatic tire including: a strip member, which extends in a tire circumferential direction, both ends thereof in a tire width direction reaching each of the bead portions; and a belt layer disposed in a tread portion on an outer side in a tire radial direction of the strip members; the strip members being divided in the tire width direction; the divided strip members having joints that join together in the tire circumferential direction; and relative positions of the joints being disposed deviated by not less than 20° in the tire circumferential direction within a region between an edge of a maximum width in the tire width direction of the belt layer and a maximum tire width position.

According to this pneumatic tire, the relative positions of each of the joints of the divided strip members in the tire width direction are disposed separated in the tire circumferential direction in the region corresponding to the ground contact length within the region between the edge of the maximum width in the tire width direction of the belt layer and the maximum tire width position. The above region is easily affected by the forces acting on the ground surface (RFV), and by disposing the relative positions of the joints separated from each other in the tire circumferential direction in the region corresponding to the ground contact length, the effect of ground contact is not simultaneous in the tire width direction, and peak positions of the forces acting on the ground surface are dispersed, so that it is possible to improve the uniformity.

Furthermore, the pneumatic tire according to a second embodiment is the first embodiment, wherein the strip member is at least one selected from a carcass layer having both ends thereof in the tire width direction fold around each of the bead portions, or an inner liner layer that is applied to a tire inner surface.

According to this pneumatic tire, by configuring at least one of the carcass layer and the inner liner layer within the region between the edge of the maximum width in the tire width direction of the belt layer and the maximum tire width position as described above, it is possible to obtain a significant effect of improvement in uniformity.

Moreover, the pneumatic tire according to a third embodiment is the second embodiment, wherein if the strip member includes the carcass layer and the inner liner layer, the relative positions of the joints of the carcass layer and the inner liner layer that are opposite each other in the tire width direction are disposed deviated by not less than 20° in the tire circumferential direction within a region between the edge at the maximum width in the tire width direction of the belt layer and the maximum tire width position.

According to this pneumatic tire, by configuring the carcass layer and the inner liner layer as described above, the carcass layer and the inner liner layer are not affected simultaneously by ground contact in the tire width direction, and the peak positions of the forces acting on the ground surface are dispersed more, so it is possible to obtain a significant effect of improvement in uniformity.

Furthermore, the pneumatic tire according to a fourth embodiment is any one of the first to third embodiments, wherein if the strip member that is divided in the tire width direction has a plurality of joints and a total number of the joints is A, spacing of the joints in the tire circumferential direction is within a range of not less than $(360°/A) \times (+0.7)$ and not greater than $(360°/A) \times (+1.3)$, the plurality of joints being disposed with non-uniform spacing in the tire circumferential direction.

If the spacing of the plurality of joints in the tire circumferential direction is uniform, the peak positions of the forces acting on the ground surface becomes the uniform positions in the tire circumferential direction of one of the strip members that is divided in the tire width direction, and the uniformity improvement effect tends to be small. According to this pneumatic tire, if the spacing of the plurality of joints in the tire circumferential direction is non-uniform spacing, the peak positions of the force acting on the ground surface become non-uniform positions in the tire circumferential direction of the one strip member that is divided in the tire width direction, and uniformity improvement effect is increased.

Moreover, the pneumatic tire according to a fifth embodiment is any one of the first to fourth embodiments, wherein the strip member is a carcass layer, which extends in the tire circumferential direction, both ends thereof in the tire width direction fold around each of the bead portions; and a divided width of each of the divided carcass layers is not less than −30% and not greater than 95% of the maximum width in the tire width direction of the belt layer.

If the divided width of the divided carcass layer is less than −30% of the maximum width in the tire width direction of the belt layer (if the overlap is increased), the tire mass tends to increase, and if the divided width exceeds 95% of the maximum width in the tire width direction of the belt layer, the amount of overlap of the carcass layer and the belt layer is reduced, and the tire durability tends to be reduced. Therefore, if the divided carcass layers overlap, it is preferable that the divided width is not less than −30% of the maximum width in the tire width direction of the belt layer, and if the divided edges of the divided carcass layers are separated, it is preferable that the divided width is not greater than 95% of the maximum width in the tire width direction of the belt layer.

The pneumatic tire according to the present technology can improve the uniformity.

BRIEF DESCRIPTION OF THE DRAWINGS

FIG. 10 is a table showing test results for pneumatic tires according to examples of the present technology;

FIG. 11 is a table showing test results for the pneumatic tires according to the examples of the present technology; and FIGS. 12A-12B include tables showing test results for the pneumatic tires according to the examples of the present technology.

DETAILED DESCRIPTION

An embodiment of the present technology is described below in detail based on the drawings. It is noted that the present technology is not limited to these embodiment. Furthermore, constituent elements in the embodiment include those that can be easily replaced by those skilled in the art or those substantially identical to those in the embodiment. Moreover, multiple modified examples described in the embodiment can be combined as desired within the scope apparent to a person skilled in the art.

Figure 1:
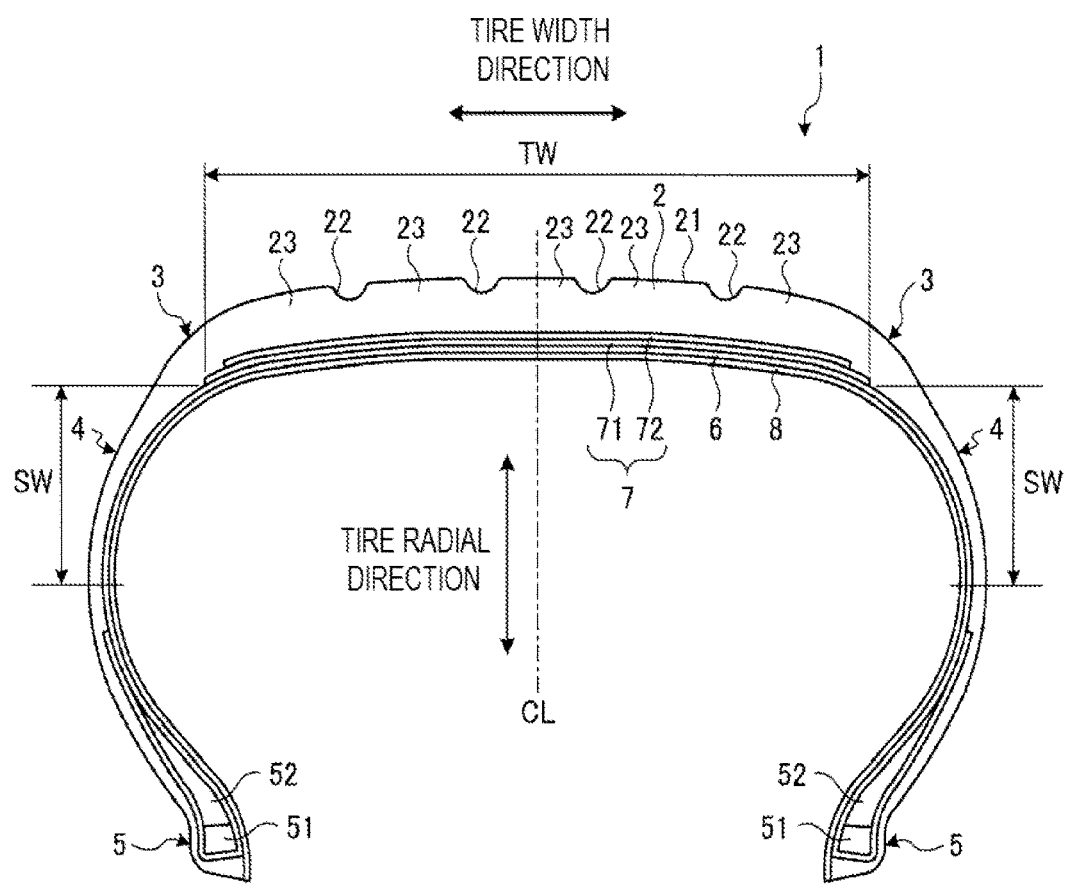
FIG. 1 is a meridian cross-sectional view showing a pneumatic tire according to an embodiment of the present technology.

FIG. 1 is a meridian cross-sectional view showing a pneumatic tire according to the present embodiment. In the following description, "tire radial direction" refers to a direction orthogonal to a rotational axis (not shown) of a pneumatic tire 1; "inner side in the tire radial direction" refers to a side facing the rotational axis in the tire radial direction; and "outer side in the tire radial direction" refers to a side distanced from the rotational axis in the tire radial direction. "Tire circumferential direction" refers to a circumferential direction with the rotational axis as a center axis. Additionally, "tire width direction" refers to a direction parallel to the rotational axis; "inner side in the tire width direction" refers to a side facing a tire equatorial plane (tire equator line) CL in the tire width direction; and "outer side in the tire width direction" refers to a side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between elements located to the outside in the tire width direction, i.e., a distance between the elements that are the farthest from the tire equatorial plane CL in the tire width direction. "Tire equator line" refers to a line along the tire circumferential direction of the pneumatic tire 1 that lies on the tire equatorial plane CL. In this embodiment, the "tire equator line" is given the same reference symbol "CL" as that given to the tire equatorial plane.

As shown in FIG. 1, the pneumatic tire 1 of this embodiment includes a tread portion 2, shoulder portions 3 on both sides of the tread portion 2, and a sidewall portion 4 and a bead portion 5 continuing sequentially from each of the shoulder portions 3. The pneumatic tire 1 also includes a carcass layer 6, a belt layer 7, and an inner liner layer 8.

The tread portion 2 is formed from a rubber material (tread rubber) and exposed on an outermost side in the tire radial direction of the pneumatic tire 1, and a surface thereof constitutes a profile of the pneumatic tire 1. A tread surface 21 is formed on a peripheral surface of the tread portion 2, i.e., on a tread that contacts a road surface when traveling. A plurality of (four in this embodiment) main grooves 22 that extend in the tire circumferential direction is provided on the tread surface 21. Moreover, a plurality of rib-like land portions 23 extending along the tire circumferential direction is formed in the tread surface 21 by the plurality of main grooves 22. Additionally, while not explicitly illustrated in the drawings, lug grooves that intersect the main grooves 22 in each of the land portions 23 are provided in the tread surface 21. The land portions 23 are divided into a plurality of segments in the tire circumferential direction by the lug grooves. Furthermore, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are regions on both outer sides in the tire width direction of the tread portion 2. Moreover, the sidewall portions 4 are exposed on the outermost side in the tire width direction of the pneumatic tire 1. The bead portions 5 each include a bead core 51 and a bead filler 52. The bead core 51 is formed by winding a bead wire that is a steel wire into a ring shape. The bead filler 52 is a rubber member that is disposed in a space formed by wrapping around ends of the carcass layer 6 in the tire width direction at the position of the bead core 51.

The carcass layer 6 constitutes a strip member of the present embodiment, and both of the ends in the tire width direction are wrapped over the pair of bead cores 51 from the inner side in the tire width direction outward in the tire width direction and extends upwards to the outer side in the tire radial direction, and the carcass layer 6 is extended into a toroidal shape in the tire circumferential direction to form the framework of the tire. At least one layer of this carcass layer 6 is provided. The carcass layer 6 is constituted by a plurality of carcass cords (not shown) juxtaposed in the tire circumferential direction along the tire meridian direction having a given angle with respect to the tire circumferential direction, and is covered by coating rubber. The carcass cords are formed from organic fibers (polyester, rayon, or nylon). Alternatively, the carcass layer 6 may be formed from a thermoplastic resin sheet. The thermoplastic resin sheet contains a thermoplastic resin or a thermoplastic elastomer composition in which elastomer components are blended into the thermoplastic resin, so that the thermoplastic resin sheet includes no cords.

Examples of the thermoplastic resin used in the present embodiment include polyamide resins (nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6, nylon 6T, nylon 9T, nylon 6/6T copolymers, nylon 66/PP copolymers, and nylon 66/PPS copolymers); polyester resins (aromatic polyesters such as polybutylene terephthalate (PBT), polyethylene terephthalate (PET), polyethylene isophthalate (PEI), polybutylene terephthalate/tetramethylene gylcol copolymers, PET/PEI copolymers, polyarylate (PAR), polybutylene naphthalate (PBN), liquid crystal polyester, and polyoxyalkylene diimidic diacid/polybutylene terephthalate copolymers); polynitrile resins (polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); poly(meth)acrylate resins (polymethylmethacrylate (PMMA), polyethylmethacrylate, ethylene ethyl acrylate copolymers (EEA), ethylene acrylate copolymers (EAA), and ethylene methyl acrylate resins (EMA)); polyvinyl resins (vinyl acetate (EVA), polyvinylalcohol (PVA), vinyl alcohol/ethylene copolymers (EVOH), polyvinylidene chloride (PVDC), polyvinyl chloride (PVC), vinyl chloride/vinylidene chloride copolymers, and vinylidene chloride/methylacrylate copolymers); cellulose resins (cellulose acetate and cellulose acetate butyrate); fluorine resins (polyvinylidene fluoride (PVDF), polyvinyl fluoride (PVF), polychlorofluoroethylene (PCTFE), and tetrafluoroethylene/ethylene copolymers (ETFE)); imide resins (aromatic polyimide (PI)); and the like.

Examples of the elastomer used in the present embodiment include diene rubbers and hydrogenates thereof (NR, IR, epoxidized natural rubber, SBR, BR (high-cis BR and low-cis BR), NBR, hydrogenated NBR, and hydrogenated SBR); olefin rubbers (ethylene propylene rubber (EPDM, EPM), maleated ethylene propylene rubber (M-EPM); butyl rubber (IIR); isobutylene and aromatic vinyl or diene monomer copolymers; acrylic rubber (ACM); ionomer; halogen-based rubbers (Br-IIR, Cl-IIR, brominated copolymer of isobutylene/para-methyl styrene (Br-IPMS), chloroprene rubber (CR), hydrin rubber (CHC, CHR), chlorosulfonated polyethylene (CSM), chlorinated polyethylene (CM), and maleated chlorinated polyethylene (M-CM)); silicone rubbers (methyl vinyl silicone rubber, di-methyl silicone rubber, and methyl phenyl vinyl silicone rubber); sulfur-containing rubbers (polysulfide rubber); fluororubbers (vinylidene fluoride rubbers, fluorine-containing vinyl ether rubbers, tetrafluoroethylene-propylene rubbers, fluorine-containing silicone rubbers, and fluorine-containing phosphazene rubbers); and thermoplastic elastomers (styrene elastomers, olefin elastomers, polyester elastomers, urethane elastomers, and polyamide elastomers).

The belt layer 7 has a multi-layer structure where at least two belt layers 71 and 72 are stacked. The belt layer 7 is disposed on the outer side in the tire radial direction that is the periphery of the carcass layer 6 in the tread portion 2, and covers the carcass layer 6 in the tire circumferential direction. The belt layers 71 and 72 are constituted by a plurality of cords (not shown) juxtaposed at a predetermined angle with respect to the tire circumferential direction (e.g. 20 degrees to 30 degrees), with the cords covered with coating rubber. The cords are formed from steel or organic fibers (polyester, rayon, or nylon). Moreover, the overlapping belt layers 71 and 72 are disposed so that the cords thereof mutually intersect.

The inner liner layer 8 constitutes the strip member of the present embodiment; is the tire inner surface, i.e., the inner circumferential surface of the carcass layer 6; has both ends in the tire width direction reach the pair of bead portion 5; and is extended in the tire circumferential direction into a toroidal shape. The inner liner layer 8 is provided to prevent diffusion of air molecules to the tire outer side. The inner liner layer 8 is formed from butyl rubber. Alternatively, the inner liner layer 8 may be formed from a thermoplastic resin sheet, similarly to the carcass layer 6.

Figure 2:
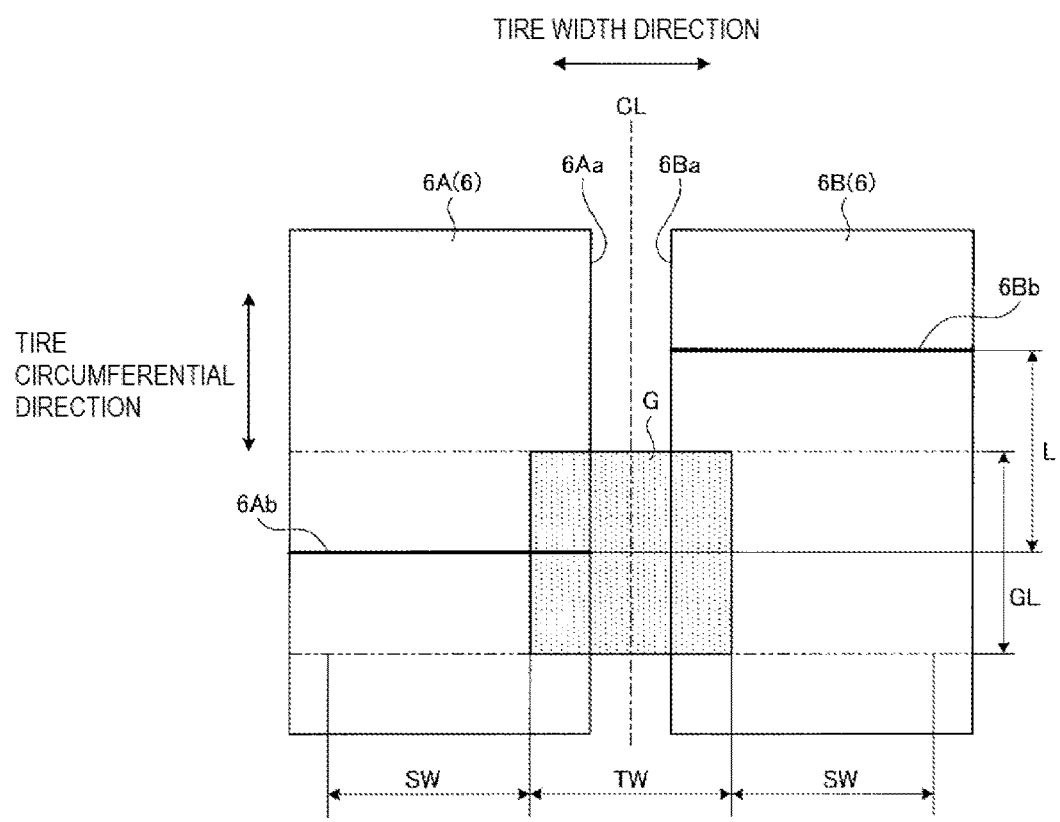
FIG. 2 is a partial enlarged developed view of a strip member showing a joint in the pneumatic tire according to the embodiment of the present technology.
Figure 3:
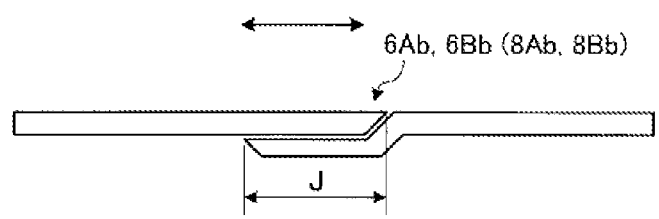
FIG. 3 is an enlarged view showing a joint in the pneumatic tire according to the embodiment of the present technology.
Figure 4:
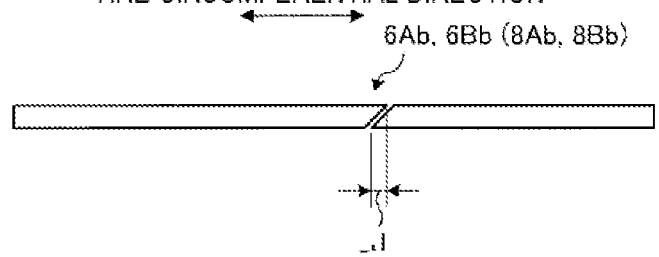
FIG. 4 is an enlarged view showing a joint in the pneumatic tire according to the embodiment of the present technology.
Figure 5:
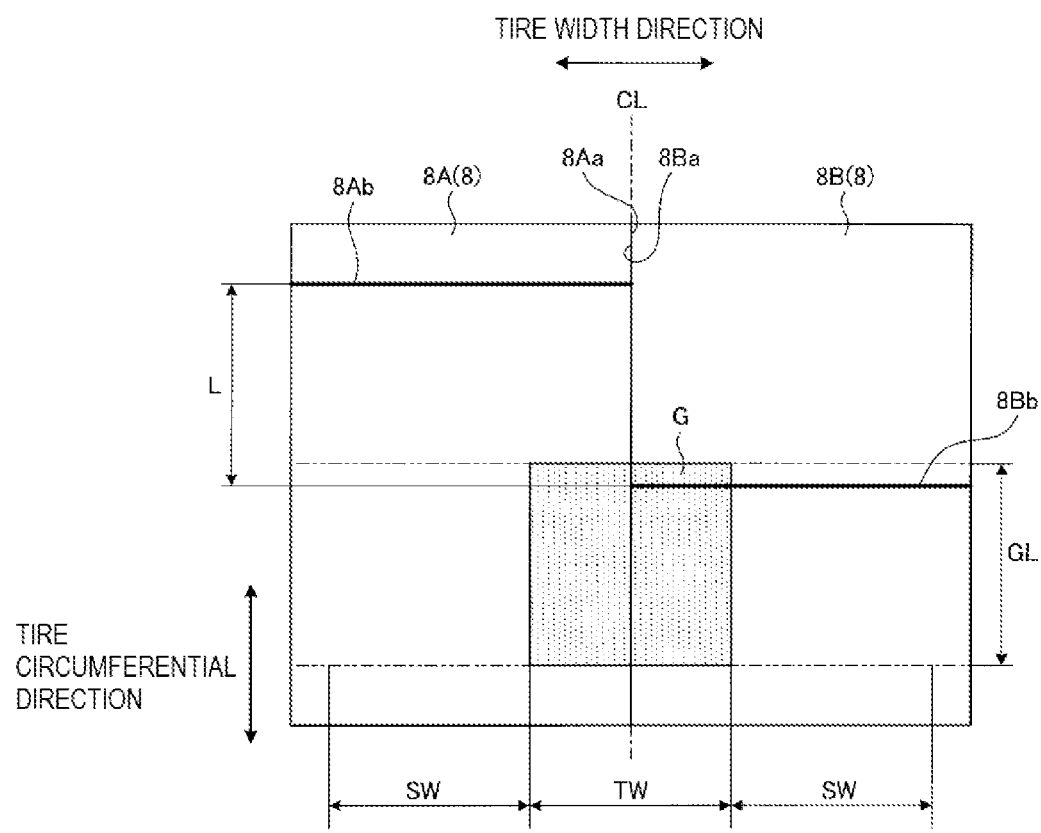
FIG. 5 is a developed view of the strip member showing a joint in the pneumatic tire according to the embodiment of the present technology.
Figure 6:
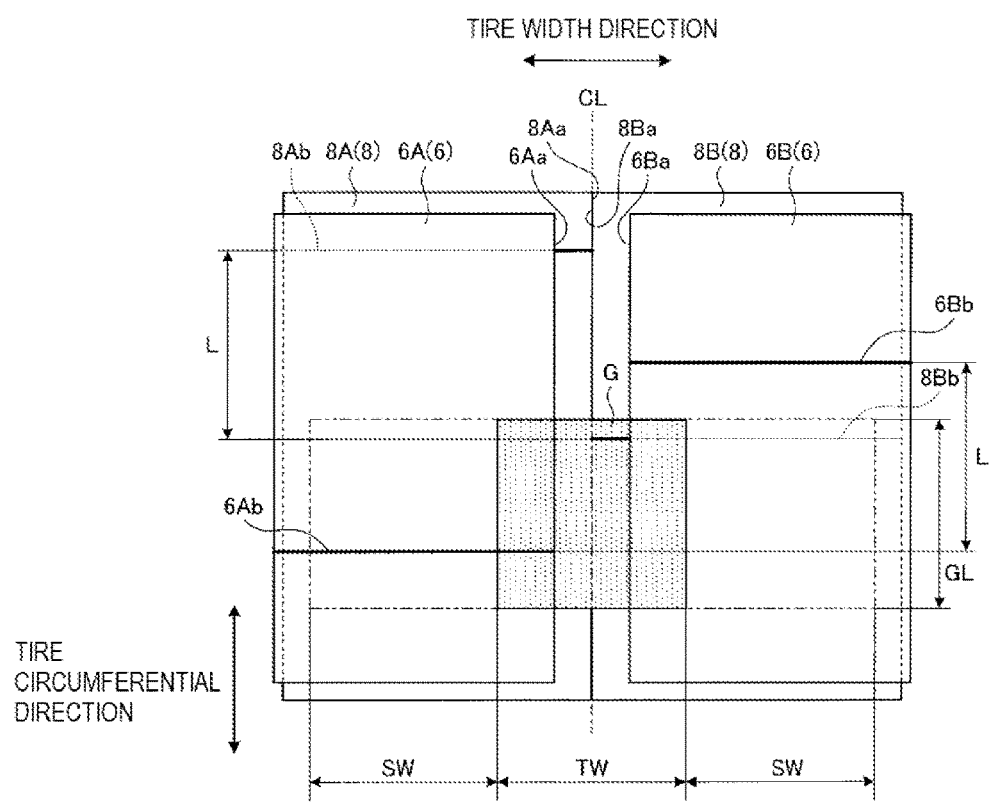
FIG. 6 is a developed view of a strip member showing a joint in the pneumatic tire according to the embodiment of the present technology.
Figure 7:
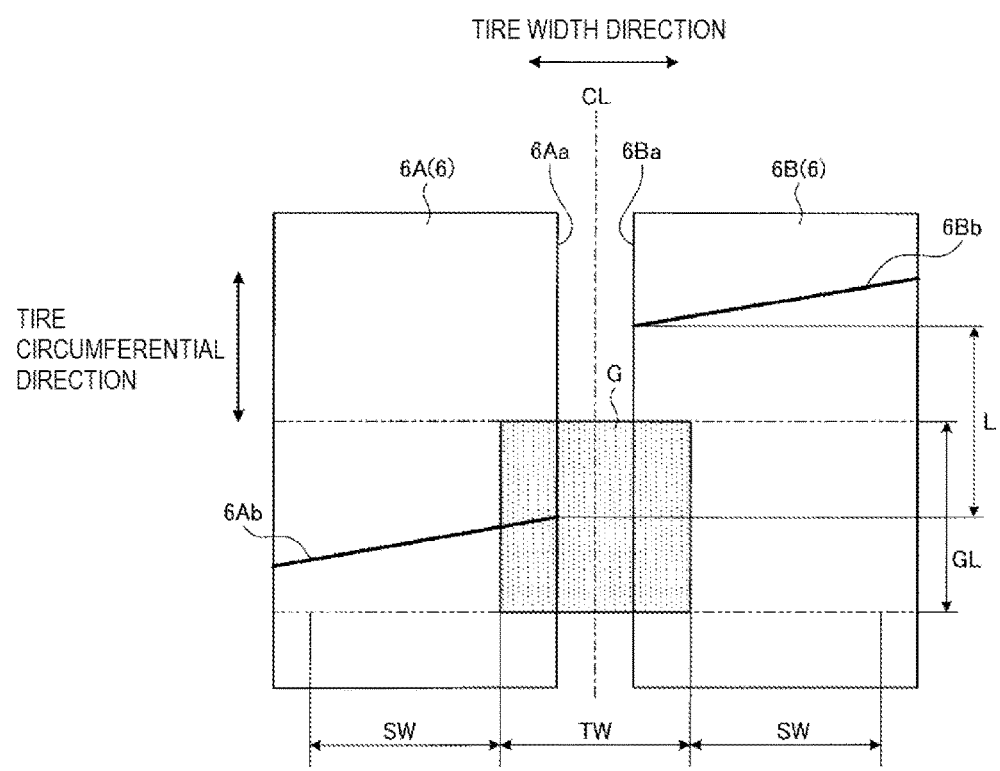
FIG. 7 is a developed view of the strip member showing another example of a joint in the pneumatic tire according to the embodiment of the present technology.

FIG. 2 is a partial enlarged developed view of the strip member (carcass layer) showing a joint in the pneumatic tire according to the present embodiment, FIGS. 3 and 4 are enlarged views showing a joint in the pneumatic tire according to the present embodiment, FIG. 5 is a developed view of the strip member (inner liner layer) showing a joint in the pneumatic tire according to the present embodiment, FIG. 6 is a developed view of the strip member (carcass layer and inner liner layer) showing a joint in the pneumatic tire according to the present embodiment, and FIG. 7 is a developed view of the strip members (carcass layer) showing another example of the joint in the pneumatic tire according to the present embodiment.

The strip members of the pneumatic tire 1 according to the present embodiment, namely the carcass layer 6 and the inner liner layer 8, are divided in the tire width direction.

FIG. 2 shows the carcass layer 6 that is the strip member in a divided state, with the divided carcass layers 6 shown as divided carcass layers 6A and 6B. Furthermore, in FIG. 2, the carcass layer 6 (divided carcass layers 6A and 6B) is shown without showing a portion thereof in the tire circumferential direction and a portion thereof on the bead portion 5 side in the radial direction. The divided carcass layers 6A and 6B are disposed, with divided edges 6Aa and 6Ba thereof opposite each other with a gap therebetween. Although not shown, the divided edges 6Aa and 6Ba of the divided carcass layers 6A and 6B may be disposed butted against each other. In this case, the position of the butt may be on the tire equator line CL, or may be off the tire equator line CL. Alternatively, although not shown, the divided carcass layers 6A and 6B may be disposed with the divided edges 6Aa and 6Ba overlapping each other.

Each of the divided carcass layers 6A and 6B is extended in the tire circumferential direction, and include joints 6Ab and 6Bb, respectively in which the two edges opposite to each other in the tire circumferential direction are joined to each other. Here, the joints 6Ab and 6Bb are joined so that the two edges that are opposite each other in the tire circumferential direction overlap each other as shown in FIG. 3, or are joined so that the two edges that are opposite each other in the tire circumferential direction overlap each other by being bevelled and butted together as shown in FIG. 4. In FIG. 2, these joints 6Ab and 6Bb are indicated linearly.

Furthermore, relative positions of the joints 6Ab and 6Bb of the divided carcass layers 6A and 6B of the carcass layer 6 are disposed within a region SW between an edge of the maximum width TW in the tire width direction of the belt layer 7 and a maximum tire width position, as shown in FIGS. 1 and 2, and deviated by at least 20° in the tire circumferential direction when the pneumatic tire 1 is assembled onto a regular rim and filled with the regular inner pressure under no load conditions. As shown in FIG. 2, a region L of 20° in the tire circumferential direction is a region equivalent to a ground contact length GL in commonly used pneumatic tires 1. In other words, the relative positions of the joints 6Ab and 6Bb in the respective divided carcass layers 6A and 6B are separated by not less than the region corresponding to the ground contact length GL of the normal pneumatic tire 1. The joints 6Ab and 6Bb have the width J in the tire circumferential direction as described above, and are disposed so that this width J does not fall in a region of 20° or less in the tire circumferential direction. Moreover, the joints 6Ab and 6Bb within all of the region SW or not less than 50% of the region SW between the edges of the maximum width TW in the tire width direction of the belt layer 7 and the maximum tire width position are disposed deviated by not less than 20° in the tire circumferential direction.

Here, the tire maximum width (also referred to as "tire cross-sectional width") is a distance in the tire width direction of the parts farthest from the tire equator line CL when the pneumatic tire 1 is assembled onto the regular rim and filled with the regular inner pressure under no load conditions, and excludes widths of patterns, characters or the like on the tire side surface. In a tire provided with a rim protector bar (provided protruding to the outer side in the tire width direction along the tire circumferential direction in the inner side in the tire radial direction of the sidewall portion 4) to protect the rim, the rim protector bar is an element that is the widest in the tire width direction. In the present embodiment, however, the definition of tire maximum width excludes the rim protector bar.

Moreover, the ground contact length GL is the maximum straight line distance in the tire circumferential direction of the ground contact patch (ground contact patch: indicated by reference symbol G in the drawing) between the tire and a flat plate when the pneumatic tire 1 is assembled onto the regular rim and filled with the regular inner pressure and a load corresponding to a regular load is applied to the tire with the tire placed perpendicularly to the flat plate in a stationary state. The ground contact patch G is indicated as a substantially rectangular patch in the drawing, but actually has a bag shape without corners. Furthermore, the ground contact patch G is shown on the drawing as having the same width as the ground contact width, which is the maximum straight line width in the tire width direction, and the maximum width TW in the tire width direction of the belt layer 7, but the width of the ground contact patch G is not limited to this.

Note that the "regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). The "regular inner pressure" refers to "maximum air pressure" defined by JATMA, a maximum value in "tire load limits at various cold inflation pressures" defined by TRA, or "inflation pressures" defined by ETRTO. Furthermore, the "regular load" refers to "maximum load capacity" defined by JATMA, a maximum value in "tire load limits at various cold inflation pressures" defined by TRA, and "load capacity" defined by ETRTO.

FIG. 5 shows the inner liner layer 8 that is the strip member in a divided state, with the divided inner liner layer 8 shown as divided inner liner layers 8A and 8B. Moreover, in FIG. 5, the inner liner layer 8 (divided inner liner layers 8A and 8B) is shown without showing a portion thereof in the tire circumferential direction and a portion thereof on the bead portion 5 side in the radial direction. The divided inner liner layers 8A and 8B are butt jointed together at the divided edges 8Aa and 8Ba. In this case, the position of the butt may be on the tire equator line CL, or may be off the tire equator line CL.

Each of the divided inner liner layers 8A and 8B is extended in the tire circumferential direction, and include joints 8Ab and 8Bb, respectively in which the two edges that are opposite each other in the tire circumferential direction are joined to each other. Here, the joints 8Ab and 8Bb are joined so that the two edges that are opposite each other in the tire circumferential direction overlap each other as shown in FIG. 3, or are joined so that the two edges that are opposite each other in the tire circumferential direction overlap each other by bevelling them and butting them together as shown in FIG. 4. In FIG. 5, these joints 8Ab and 8Bb are indicated linearly.

Furthermore, relative positions of the joints 8Ab and 8Bb of the divided inner liner layers 8A and 8B of the inner liner layer 8 are disposed within the region SW between the edge of the maximum width TW in the tire width direction of the belt layer 7 and the maximum tire width position, as shown in FIGS. 1 and 5, and deviated by at least 20° in the tire circumferential direction when the pneumatic tire 1 is assembled onto the regular rim and filled with the regular inner pressure under no load conditions. As shown in FIG. 5, the region L of 20° in the tire circumferential direction is a region equivalent to the ground contact length GL in a low profile tire in which the ground contact length GL is comparatively short. In other words, the relative positions of the joints 8Ab and 8Bb in the respective divided inner liner layers 8A and 8B are separated by not less than the region corresponding to the ground contact length GL of the low profile tire. The joints 8Ab and 8Bb have the width J in the tire circumferential direction as described above, and are disposed so that this width J does not fall in the region of 20° or less in the tire circumferential direction. Moreover, the joints 8Ab and 8Bb within all of the region SW or not less than 50% of the region SW between the edge of the maximum width TW in the tire width direction of the belt layer 7 and the maximum tire width position are deviated by at least 20° in the tire circumferential direction.

In FIG. 6, the strip members which are the carcass layer 6 and the inner liner layer 8 are shown in divided states, i.e., in the combined forms shown in FIGS. 2 and 5. In other words, the relative positions of the joints 6Ab and 6Bb of the divided carcass layers 6A and 6B of the carcass layer 6 are disposed within the region SW between the edge of the maximum width TW in the tire width direction of the belt layer 7 and the maximum tire width position, as shown in FIGS. 1 and 6, and deviated by at least 20° in the tire circumferential direction when the pneumatic tire 1 is assembled onto the regular rim and filled with the regular inner pressure under no load conditions. In addition, relative positions of the joints 8Ab and 8Bb of the divided inner liner layers 8A and 8B of the inner liner layer 8 are disposed within the region SW between the edge of the maximum width TW in the tire width direction of the belt layer 7 and the maximum tire width position, as shown in FIGS. 1 and 6, and deviated by at least 20° in the tire circumferential direction when the pneumatic tire 1 is assembled onto the regular rim and filled with the regular inner pressure under no load conditions.

If the relative positions of the joints 6Ab and 6Bb of the divided carcass layers 6A and 6B and the relative positions of the joints 8Ab and 8Bb of the divided inner liner layers 8A and 8B are disposed deviated by not less than 20° in the tire circumferential direction as described above, the relative positions opposite each other of the joint 6Ab of the divided carcass layer 6A and the joint 8Ab of the divided inner liner layer 8A are preferably deviated by not less than 20° in the tire circumferential direction, and the relative positions opposite each other of the joint 6Bb of the divided carcass layer 6B and the joint 8Bb of the divided inner liner layer 8B are preferably deviated by not less than 20° in the tire circumferential direction.

In FIG. 7, the carcass layer 6 that is the strip member is shown as in a divided state, and the joints 6Ab and 6Bb extend at an inclination with respect to the radial direction. In this case, similar to the above, the relative positions of the joints 6Ab and 6Bb of the divided carcass layers 6A and 6B of the carcass layer 6 are disposed within the region SW between the edge of the maximum width TW in the tire width direction of the belt layer 7 and the maximum tire width position, as shown in FIGS. 1 and 7, and deviated by at least 20° in the tire circumferential direction when the pneumatic tire 1 is assembled onto the regular rim and filled with the regular inner pressure under no load conditions. In other words, the portions of the joints 6Ab and 6Bb that extend at an inclination that are closest in the tire circumferential direction are disposed deviated in the tire circumferential direction by not less than 20°. The orientations of the inclination of the joints 6Ab and 6Bb may be the same as shown in FIG. 7, or may be different although not shown. Although not shown, in the inner liner layer 8 that is the strip member, the joints 8Ab and 8Bb of the inner liner layer 8 may similarly extend at an inclination with respect to the radial direction. In this case, the portions of the joints 8Ab and 8Bb that extend at an inclination that are similarly closest in the tire circumferential direction are disposed deviated in the tire circumferential direction by not less than 20°.

In this way, the pneumatic tire 1 according to the present embodiment include a strip member (carcass layer 6, inner liner layer 8, or the like), which extends in the tire circumferential direction, both ends thereof in the tire width direction reaching each of the bead portions 5; and the belt layer 7 disposed in the tread portion 2 on the outer side in the tire radial direction of the strip members, the strip member is divided in the tire width direction, and the divided strip members (divided carcass layers 6A and 6B, or divided inner liner layers 8A and 8B) have the joints (6Ab and 6Bb, or 8Ab and 8Bb) that join together in the tire circumferential direction, and the relative positions of the joints are disposed deviated by not less than 20° in the tire circumferential direction within the region SW between the edge of the maximum width TW in the tire width direction of the belt layer 7 and the maximum tire width position.

According to this pneumatic tire 1, the relative positions of the joints of the divided strip members in the tire width direction are disposed separated in the tire circumferential direction in the region corresponding to the ground contact length GL within the region SW between the edge of the maximum width TW in the tire width direction of the belt layer 7 and the maximum tire width position. The above regions SW are easily affected by the forces acting on the ground surface (RFV), and by disposing the relative positions of the joints separated from each other in the tire circumferential direction in the region corresponding to the ground contact length GL, the effect of ground contact is not simultaneous in the tire width direction, and peak positions of the forces acting on the ground surface are dispersed, so that it is possible to improve the uniformity.

Furthermore, in the pneumatic tire 1 according to the present embodiment, it is preferable that the strip member is at least one selected from the carcass layer 6 having both ends thereof in the tire width direction folded around each of the two bead portions 5, or the inner liner layer 8 that is applied to the tire inner surface.

According to this pneumatic tire 1, by configuring at least one of the carcass layer 6 and the inner liner layer 8 within the region SW between the edge of the maximum width TW in the tire width direction of the belt layer 7 and the maximum tire width position as described above, it is possible to obtain a significant effect of improvement in uniformity. The strip members are not limited to the carcass layer 6 and the inner liner layer 8. Provided it is a strip member (for example, a reinforcing layer) that is within the region SW between the edge of the maximum width TW in the tire width direction of the belt layer 7 and the maximum tire width position, it is possible to obtain the effect of improvement in uniformity by the above configuration.

Moreover, in the pneumatic tire 1 according to the present embodiment, if the strip member includes the carcass layer 6 and inner liner layer 8, it is preferable that the relative positions of the joints 6Ab and 6Bb, and 8Ab and 8Bb of the carcass layer 6 and the inner liner layer 8 that are opposite each other in the tire width direction are disposed deviated by not less than 20° in the tire circumferential direction within the region SW between the edge at the maximum width TW in the tire width direction of the belt layer 7 and the maximum tire width position.

According to this pneumatic tire 1, by configuring the carcass layer 6 and the inner liner layer 8 as described above, the carcass layer 6 and the inner liner layer 8 are not affected simultaneously by the ground contact in the tire width direction, and the peak positions of the forces acting on the ground surface are dispersed more, so it is possible to obtain a significant effect of improvement in uniformity.

Furthermore, in the pneumatic tire 1 according to the present embodiment, if the strip member (carcass layer 6, inner liner layer 8 or the like) that is divided in the tire width direction has a plurality of joints (6Ab and 6Bb, or 8Ab and 8Bb) and their total number is A, it is preferable that the spacing of the joints in the tire circumferential direction is within the range not less than $(360°/A)\times(+0.7)$ and not greater than $(360°/A)\times(+1.3)$, and that the plurality of joints is disposed with non-uniform spacing in the tire circumferential direction.

Figure 8:
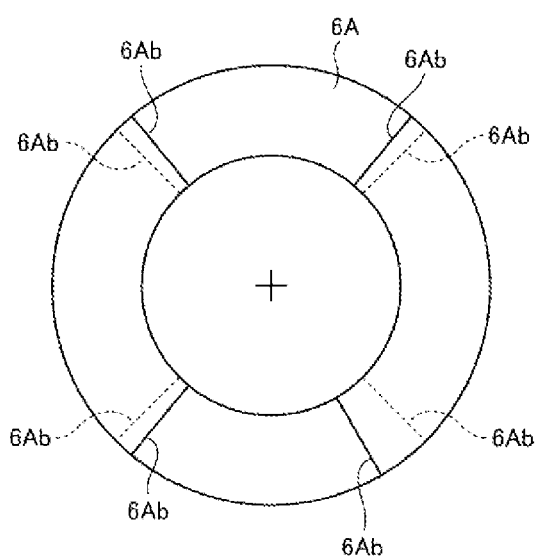
FIG. 8 is a side view of the strip member showing a joint in the pneumatic tire according to the embodiment of the present technology.

According to this pneumatic tire 1, as shown in the side view of the belt member showing the joints in the pneumatic tire according to the present embodiment in FIG. 8, in a case where the total number of joints A is four (in FIG. 8, the strip member is the carcass layer 6 and the joints 6Ab of the divided carcass layer 6A are shown), the spacing of the joints 6Ab in the tire circumferential direction is not less than 63° and not greater than 117°. If the spacing of the four joints 6Ab in the tire circumferential direction is uniform, the spacing is 90° as indicated by the broken lines in FIG. 8, the peak positions of the forces acting on the ground surface becomes the uniform positions in the tire circumferential direction of one of the strip members that is divided in the tire width direction, and the uniformity improvement effect tends to be small. Therefore, if the spacing of the four joints 6Ab in the tire circumferential direction is non-uniform spacing within the range not less than 63° and not greater than 117° (in FIG. 8, clockwise from the top, the angles are 80°, 110°, 70°, and 100°), the peak positions of the force acting on the ground surface become non-uniform positions in the tire circumferential direction of the one strip member that is divided in the tire width direction, and the uniformity improvement effect is increased. In the present embodiment, the non-uniform spacing may include, for example, clockwise 80°, 100°, 80°, 100°, or clockwise 80°, 80°, 100°, 100°.

If the carcass layer 8 and the inner liner layer 8 as strip members are divided, and the total number of the plurality of joints in one of the carcass layer and the inner liner layer that are divided in the tire width direction is A, it is preferable that the spacing of the joints in the tire circumferential direction is within the range not less than (360°/A)×(+0.7) and not greater than (360°/A)×(+1.3), and the plurality of joints has unequal spacing in the tire circumferential direction. According to this, the uniformity improvement effect is increased, including the carcass layer 6 and the inner liner layer 8.

Figure 9:
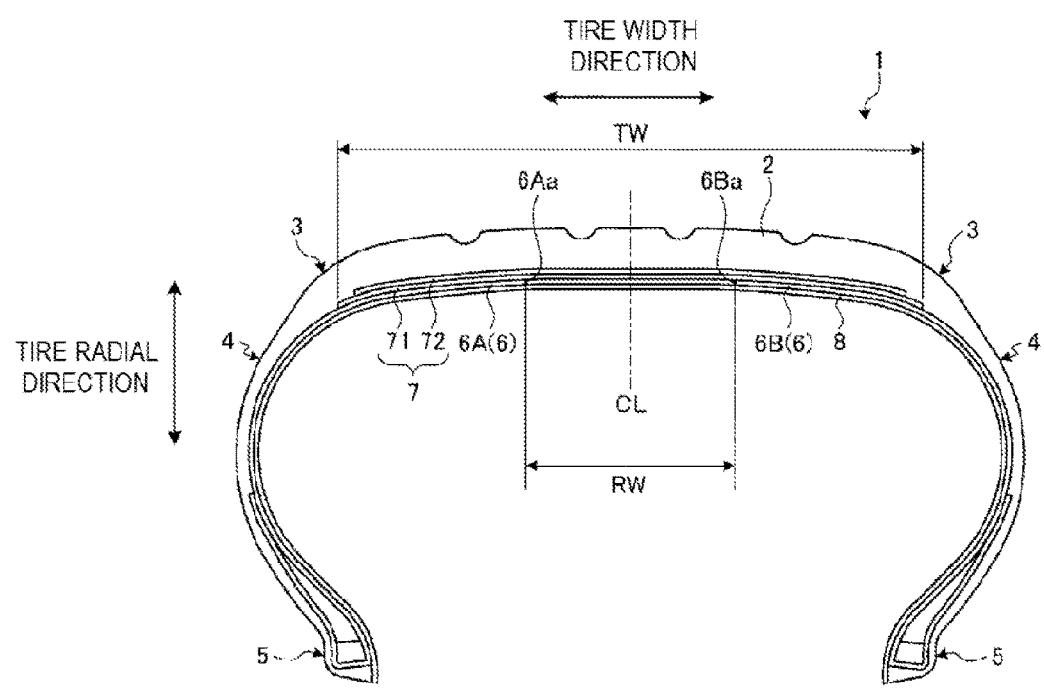
FIG. 9 is a meridian cross-sectional view showing an example of a carcass layer of the pneumatic tire according to an embodiment of the present technology.

Moreover, in the pneumatic tire 1 according to the present embodiment, as shown in the meridian cross-sectional view of FIG. 9 which shows an example of the carcass layer of the pneumatic tire according to the present embodiment, it is preferable that the divided width RW (dimension in the tire width direction of the divided edges 6Aa and 6Ba) of each divided carcass layer (divided carcass layers 6A or 6B) is not less than −30% and not greater than 95% of the maximum width TW in the tire width direction of the belt layer 7.

Here, the divided width RW is −30% of the maximum width TW in the tire width direction of the belt layer 7 refers to the dimension in the tire width direction of the divided edges 6Aa and 6Ba when the divided carcass layers 6A and 6B overlap with each other so that the divided edge 6Aa overlaps with the divided carcass layer 6B and so that the divided edge 6Ba overlaps with the divided carcass layer 6A. In other words, when the divided carcass layers 6A and 6B mutually overlap, it is preferable that the divided width RW is not less than −30% of the maximum width TW in the tire width direction of the belt layer 7, and if the divided edges 6Aa and 6Ba of the divided carcass layers are separated, it is preferable that the divided width RW is not greater than 95% of the maximum width TW in the tire width direction of the belt layer 7. If the divided width RW is less than −30% of the maximum width TW in the tire width direction of the belt layer 7, the tire mass tends to increase, and if the divided width RW exceeds 95% of the maximum width TW in the tire width direction of the belt layer 7, the amount of overlap of the carcass layer 6 and the belt layer 7 is reduced, and the tire durability tends to be reduced.

Examples

FIGS. 10 to 12B are tables showing test results for pneumatic tires according to working examples. In these working examples, tests were carried out for the uniformity, tire mass, and durability for various types of pneumatic tires under different conditions.

In the tests, pneumatic tires of tire size 235/40R18 were used as the test tires.

The method of evaluating the uniformity was to measure the radial force variation (RFV) in accordance with the method of measurement "Test Procedures for Automobile Tire Uniformity" JASO 607, for each of the test tires which was assembled onto the regular rim, which was filled with the regular inner pressure (180 kPa), and to which the regular load was applied. Evaluations were performed by indexing the measurement results with the conventional example as the standard score (100). Greater index scores indicate enhanced uniformity.

The method of evaluating the tire mass was to measure the mass of each of the test tire using a weighing machine. Evaluations were performed by indexing the measurement results with the conventional example as the standard score (100). Greater index scores indicate a lighter tire mass which is preferable.

The method of evaluating the durability was to install each of the test tires which was assembled onto the regular rim and which was filled with the regular inner pressure (180 kPa) onto a drum test machine with a drum diameter of 1707 mm, and to measure the external appearance of the tire and occurrences of internal damage after driving the test tire at a speed of 81 km/h and an ambient temperature of 38±3° C. with 85% of the maximum load defined by JATMA for 4 hours, 90% for 6 hours, 100% for 24 hours, 115% for 4 hours, 130% for 4 hours, 145% for 4 hours, and 160% for 4 hours. ○ indicates no damage, and x indicates occurrence of damage.

As shown in FIG. 10, in a conventional pneumatic tire according to the Conventional Example, the carcass layer and the inner liner layer were not divided. In a pneumatic tire according to Comparative Example 1, the carcass layer was divided in the tire width direction, but the relative positions of the joints of each of the divided carcass layers were within 20° in the tire circumferential direction within the region between the edge of the maximum width in the tire width direction of the belt layer and the maximum tire width position.

On the other hand, as shown in FIG. 10, in the pneumatic tires according to Working Example 1 to Working Example 8, the carcass layer was divided in the tire width direction, and the relative positions of the joints of the divided carcass layers were not less than 20° in the tire circumferential direction within the region between the edge of the maximum width in the tire width direction of the belt layer and the maximum tire width position. In the pneumatic tire according to Working Example 1, each divided carcass layer had one joint. In the pneumatic tire according to Working Example 2, each divided carcass layer had a plurality of joints, the spacing thereof in the tire circumferential direction was within the range of not less than (360°/A)×(+0.7) and not greater than (360°/A)×(+1.3), disposed uniformly in the tire circumferential direction. In the pneumatic tires according to Working Examples 3 to 8, each divided carcass layer had a plurality of joints, the spacing thereof in the tire circumferential direction was within the range of not less than (360°/A)×(+0.7) and not greater than (360°/A)×(+1.3), disposed non-uniformly in the tire circumferential direction. In the pneumatic tires according to Working Examples 5 to 7, the divided width of the carcass layer was not less than −30% and not greater than 95% of the maximum width of the belt layer.

As shown in FIG. 11, in the pneumatic tire according to the Conventional Example, the carcass layer and the inner liner layer were not divided. In the pneumatic tire according to Comparative Example 2, the inner liner layer was divided in the tire width direction, but the relative positions of the joints of the divided inner liner layers were within 20° in the tire circumferential direction within the region between the edge of the maximum width in the tire width direction of the belt layer and the maximum tire width position.

On the other hand, as shown in FIG. 11, in the pneumatic tires according to Working Example 9 to Working Example 11, the inner liner layer was divided in the tire width direction, and the relative positions of the joints of the divided inner liner layers were not less than 20° in the tire circumferential direction within the region between the edge of the maximum width in the tire width direction of the belt layer and the maximum tire width position. In the pneumatic tire according to Working Example 9, each divided inner liner layer had one joint. In the pneumatic tire according to Working Example 10, each divided inner liner layer had a plurality of joints, the spacing thereof in the tire circumferential direction was within the range of not less than $(360°/A)×(+0.7)$ and not greater than $(360°/A)×(+1.3)$, disposed uniformly in the tire circumferential direction. In the pneumatic tire according to Working Example 11, each divided inner liner layer had a plurality of joints, the spacing thereof in the tire circumferential direction was within the range of not less than $(360°/A)×(+0.7)$ and not greater than $(360°/A)×(+1.3)$, disposed non-uniformly in the tire circumferential direction.

As shown in FIGS. 12A-12B, in the pneumatic tire according to the Conventional Example, the carcass layer and the inner liner layer were not divided. In the pneumatic tire according to Comparative Example 3, the carcass layer and the inner liner layer were divided in the tire width direction, but the relative positions of the joints of the divided carcass layers and the divided inner liner layers were within 20° in the tire circumferential direction within the region between the edge of the maximum width in the tire width direction of the belt layer and the maximum tire width position.

On the other hand, as shown in FIGS. 12A-12B, in the pneumatic tires according to Working Example 12 to Working Example 25, the carcass layer and the inner liner layer were divided in the tire width direction, and the relative positions of the joints of the divided carcass layers were not less than 20° in the tire circumferential direction within the region between the edge of the maximum width in the tire width direction of the belt layer and the maximum tire width position. In the pneumatic tire according to Working Example 12, each divided carcass layer and divided inner liner layer had one joint. In the pneumatic tire according to Working Example 13, each divided carcass layer and divided inner liner layer had a plurality of joints, the spacing thereof in the tire circumferential direction was within the range of not less than $(360°/A)×(+0.7)$ and not greater than $(360°/A)×(+1.3)$, disposed uniformly in the tire circumferential direction. In the pneumatic tire according to Working Example 14, each divided carcass layer and divided inner liner layer had a plurality of joints, the spacing thereof in the tire circumferential direction was within the range of not less than $(360°/A)×(+0.7)$ and not greater than $(360°/A)×(+1.3)$, disposed non-uniformly in the tire circumferential direction for the divided carcass layers, and disposed uniformly for the divided inner liner layers. In the pneumatic tire according to Working Example 15, each divided carcass layer and divided inner liner layer had a plurality of joints, the spacing thereof in the tire circumferential direction was within the range of not less than $(360°/A)×(+0.7)$ and not greater than $(360°/A)×(+1.3)$, disposed uniformly in the tire circumferential direction for the divided carcass layers, and disposed non-uniformly for the divided inner liner layers. In the pneumatic tire according to Working Example 16, each divided carcass layer and divided inner liner layer had a plurality of joints, the spacing thereof in the tire circumferential direction was within the range of not less than $(360°/A)×(+0.7)$ and not greater than $(360°/A)×(+1.3)$, disposed non-uniformly in the tire circumferential direction for the divided carcass layers, and the divided inner liner layers. The pneumatic tire according to Working Example 17 was the same as Working Example 13 except the positions of the joints of the carcass layer and the inner liner layer were not less than 20° in the tire circumferential direction. The pneumatic tire according to Working Example 18 was the same as Working Example 14 except the positions of the joints of the carcass layer and the inner liner layer were not less than 20° in the tire circumferential direction. The pneumatic tire according to Working Example 19 was the same as Working Example 15 except the positions of the joints of the carcass layer and the inner liner layer were not less than 20° in the tire circumferential direction. The pneumatic tire according to Working Example 20 was the same as Working Example 16 except the positions of the joints of the carcass layer and the inner liner layer were not less than 20° in the tire circumferential direction. The pneumatic tires according to Working Examples 22 to 24 were the same as Working Example 20 except the divided width of the carcass layer was not less than −30% and not greater than 95% of the maximum width of the belt layer.

As shown in the test results of FIGS. 10 to 12B, the pneumatic tires according to Working Examples 1 to 24 had improved uniformity.

The invention claimed is:

1. A pneumatic tire comprising:
 a strip member, which extends in a tire circumferential direction, both ends thereof in a tire width direction reaching each bead portion; and
 a belt layer disposed in a tread portion on an outer side in a tire radial direction of the strip member;
 the strip member being divided in the tire width direction into first and second divided strip members;
 the first and second divided strip members having joints that join together in the tire circumferential direction;
 relative positions of the joints of the first divided strip member being disposed deviated by not less than 20° from the joints of the second divided strip member in the tire circumferential direction within a region between an edge of a maximum width in the tire width direction of the belt layer and a maximum tire width position, wherein spacing between the joints of the first divided strip member is non-uniform and spacing between the joints of the second divided strip member is non-uniform.

2. The pneumatic tire according to claim 1, wherein the strip member is at least one selected from a carcass layer having both ends thereof in the tire width direction folded around the each bead portion, or an inner liner layer that is applied to a tire inner surface.

3. The pneumatic tire according to claim 2, wherein the strip members comprise the carcass layer and the inner liner layer, and the relative positions of the joints of the carcass layer and the inner liner layer that are opposite each other in the tire width direction are disposed deviated by not less than 20° in the tire circumferential direction within the region between the edge at the maximum width in the tire width direction of the belt layer and the maximum tire width position.

4. The pneumatic tire according to claim 3, wherein the strip member that is divided in the tire width direction comprises a plurality of joints, a total number of the joints being A, and spacing of the joints in the tire circumferential direction is within a range of not less than (360°/A)×(+0.7) and not greater than (360°/A)×(+1.3), the plurality of joints being disposed with non-uniform spacing in the tire circumferential direction.

5. The pneumatic tire according to claim 4, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

6. The pneumatic tire according to claim 2, wherein the strip member that is divided in the tire width direction comprises a plurality of joints, a total number of the joints being A, and spacing of the joints in the tire circumferential direction is within a range of not less than (360°/A)×(+0.7) and not greater than (360°/A)×(+1.3), the plurality of joints being disposed with non-uniform spacing in the tire circumferential direction.

7. The pneumatic tire according to claim 1, wherein the strip member that is divided in the tire width direction comprises a plurality of joints, a total number of the joints being A, and spacing of the joints in the tire circumferential direction is within a range of not less than (360°/A)×(+0.7) and not greater than (360°/A)×(+1.3), the plurality of joints being disposed with non-uniform spacing in the tire circumferential direction.

8. The pneumatic tire according to claim 3, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

9. The pneumatic tire according to claim 2, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

10. The pneumatic tire according to claim 1, wherein the strip member comprises a carcass layer which extends in the tire circumferential direction, both ends thereof in the tire width direction fold around the each bead portion; and a divided width of each of the divided carcass layers is not less than −30% and not greater than 95% of the maximum width in the tire width direction of the belt layer.

* * * * *